United States Patent Office 3,625,704
Patented Dec. 7, 1971

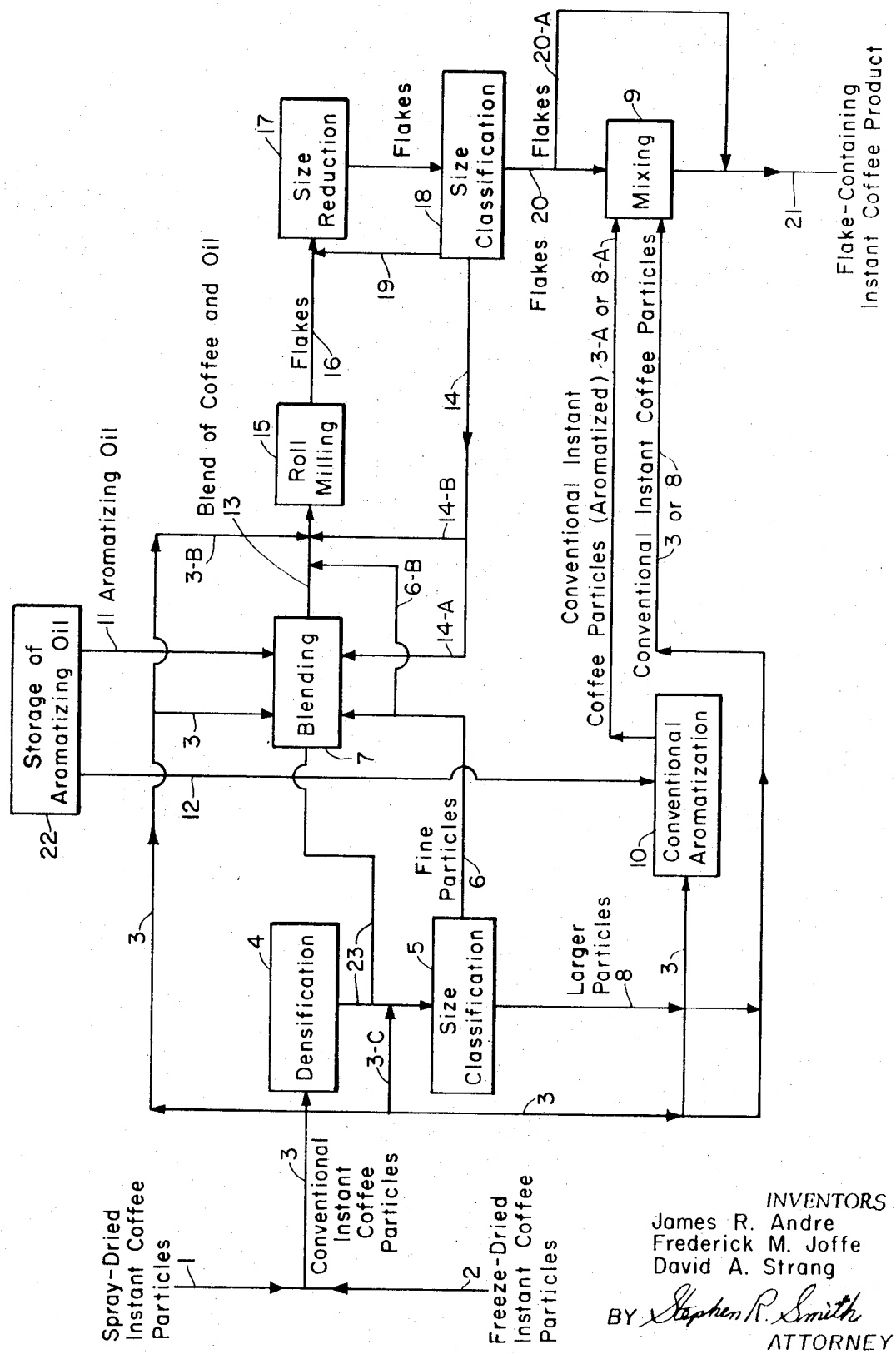

3,625,704
INSTANT COFFEE FLAKES
James R. Andre, Leawood, Kans., and Frederick M. Joffe, Cincinnati, and David A. Strang, Springfield Township, Hamilton County, Ohio, assignors to The Procter & Gamble Company, Cincinnati, Ohio
Continuation-in-part of application Ser. No. 732,479, Apr. 26, 1968, which is a continuation-in-part of application Ser. No. 638,858, May 16, 1967. This application Dec. 4, 1968, Ser. No. 786,539
Int. Cl. A23f 1/00
U.S. Cl. 99—66                          22 Claims

ABSTRACT OF THE DISCLOSURE

An instant coffee composition containing thin, dense flakes of instant coffee. The flakes are formed by roll milling instant coffee particles. Preferably, an aromatizing oil is contained in the flakes.

CROSS REFERENCE TO RELATED APPLICATIONS

This application is a continuation-in-part application of now abandoned application Ser. No. 732,479, filed Apr. 26, 1968, which was a continuation-in-part of now abandoned application Ser. No. 638, 858, filed May 16, 1967.

BACKGROUND OF THE INVENTION

This invention relates to soluble or instant coffee. More specifically, it relates to unique instant coffee flakes and to instant coffee compositions which contain said flakes and which possess numerous advantages over known instant coffee products.

For many years producers of instant coffee have sought to eliminate the differences between this type of product and conventional roast and ground coffee. The preponderance of this effort has gone into the area of flavor improvement. Absolute equality in the flavor of instant coffee compared to roast and ground coffee has not yet been achieved, but substantial improvements in the flavor of instant coffee have been made and a significant increase in consumer acceptance thereof has occurred in the last 10–15 years. Other characteristics such as aroma, density, dustiness, appearance and foaming properties have been investigated in attempts to make an improved instant coffee product. Some of these characteristics and investigations in regard thereto warrant more detailed discussion:

Appearance

It has been found that a large number of consumers would prefer a unique appearing instant coffee product and/or one which has the physical appearance of roast and ground coffee. As mentioned above, a generous amount of attention has been given to improving the flavor of instant coffee to make such products taste more like conventional roast and ground cofffffee. However, very little effort has been devoted to preparing an instant coffee which has the physical appearance of roast and ground coffee, particularly in regard to particle size and shape. Roast and ground coffee is generally comprised of a multiplicity of particles having different sizes and shapes. Most of these particles range in size from about 0.015 inch to about 0.06 inch in cross-sectional diameter and are found ranging in shape from spherical to rectangular. On the other hand, commonly available instant coffee, e.g., spray-dried instant coffee, is generally comprised of essentially spherical particles of about equal size ranging from about 0.007 inch to about 0.03 inch in diameter. It has been deemed very desirable to prepare an instant coffee product wherein the particles differ in size and shape so that the product would have a unique appearance and/or more closely resemble roast and ground coffee.

Foam

One of the problems inherent in many prior art instant coffee products is the existence of coffee foam, an unsightly froth which forms on the surface of the coffee liquid when boiling water is added to the instant coffee product to prepare it for consumption. The foam is thought to be caused by air which is present within and between the instant coffee particles. The air forms a foam when released by the addition of water and the foam apparently is stabilized by some natural constituent of coffee, possibly a proteinaceous substance. Foam will vary in amount from a layer which dominates the entire liquid surface to a thin ring or arc which attaches to the cup surface at the top of the coffee liquid. The problem is accentuated in many households by the failure to use boiling water, as cooler water tends to increase the foam problem. Several attempts have been made to solve the foam problem, such as the discovery of additives which tend to inhibit or break instant coffee foam. However, these solutions are not entirely satisfactory because they generally involve the addition of a non-coffee material to a product which is desirably comprised of 100% coffee constituents. Therefore, a method of eliminateing foam in an instant coffee product, and particularly a method which does not involve the addition of a foreign additive to the coffee, is highly desirable.

Density and dustiness

Final product density control is difficult to achieve during the production of conventional spray-dried or freeze-dried instant coffee products. To control density, the instant coffee is often dried to a lower density than is desired in the final product, and a sensitively controlled densification step is added prior to packaging. The densification step involves breaking down the larger particles present to reduce void spaces. This does effectively increase bulk density but has the undesirable effect of making the product more dusty because some very small particles are formed when the larger particles are broken down. Even when the densification step is not undertaken, an instant coffee can contain an undesirably high level of small particles. Of course, the smaller, dust-forming particles could be removed by screening to eleminate part of the dustiness, but it is not economically sound to discard any portion, no matter how small, of an instant coffee product. The need for a novel method of controlling density and/or dustiness in an instant coffee product is therefore apparent.

Aroma

Instant coffee having a desired free-flowing character is commonly prepared by spray- or freeze-drying a water extract of roasted coffee. Such instant coffee is lacking in some of the flavor and aroma usually associated with freshly brewed coffee. The aroma and flavor of such instant coffee has been improved by incorporating therein coffee oil containing aroma and flavor constituents of roast coffee obtained from the roast coffee prior to extracting it with water. Such a product is generally referred to as being aromatized. The aromatizing coffee oil is most often obtained from the roast coffee either by expression or by extraction with non-aqueous solvents. Unfortunately, the oily nature of coffee oil causes the particles of instant coffee to which it is added to adhere to one another. Consequently, the product is not free-flowing and has an unattractive appearance. Because it is not free-flowing, it is difficult for the consumer to measure, e.g., a spoonful, in order to give a cup of coffee of the desired strength. This characteristic is generally referred to in the art as "flowability" or "measurability." As the level of coffee oil is increased in order to increase the flavor and aroma intensity of the instant coffee, the free-flowing characteristics and the measurability become even poorer. Thus, either flowability or flavor and aroma have had to be sacrificed in many prior art instant coffee products.

Certain attempts have been made to solve the above-described problem of balancing aromatization and flowability. For example, U.S. Pat. 2,998,316 (Aug. 29, 1961) discloses a method of increasing the flowability of an aromatized instant coffee product which comprises including in the composition a very finely divided instant coffee powder. In U.S. Pat. 3,077,405 (Feb. 12, 1963) another solution to this problem is offered which generally involves a particular method of agglomerating aromatized instant coffee particles to increase the flowability thereof. Neither of these solutions nor other prior art solutions have been deemed to be entirely satisfactory, primarily because the proposed solutions to the aromatization-flowability problem often create other problems, particularly in the area of appearance, density, and particle size. Thus, there is a real need for a superior instant coffee product that is aromatized, yet free-flowing.

SUMMARY OF THE INVENTION

Briefly stated, this invention involves the discovery that conventional particles of instant coffee can be roll-milled into novel flakes of instant coffee, and that these flakes can be used in the preparation of unique flake-containing instant coffee compositions. Each of the many problems described above that are present in the development of a highly desirable instant coffee product can be lessened to some extent, or totally eliminated, by the novel flake-containing compositions of the present invention.

The flakes of instant coffee contemplated for use in the compositions of this invention are thin, hard flakes having a thickness within the range of from about 0.002 inch to about 0.01 inch and a density[1] within the range of from about 1.0 to about 1.5 grams per cubic centimeter (hereinafter abbreviated as "gm./cc."). These novel particles are not to be confused with the light, fluffy, porous particles of instant coffee obtained by drum or freeze drying which have also, on occasion, been referred to as "flakes."

The flake-containing instant coffee compositions of the present invention have a unique appearance and can be formulated to more nearly resemble roast and ground coffee than do ordinary instant coffee products.

The bulk density and dustiness of an instant coffee composition can be very advantageously controlled by utilizing the instant coffee flakes of the present invention. This effect is twofold: First, the flakes themselves have a higher density than ordinary instant coffee particles and thus the bulk density of the ultimate instant coffee product can be closely controlled by simply varying the amount of flakes contained therein; second, the smallest and dustiest instant coffee particles can be removed from an instant coffee composition and these relatively undesirable particles can be used in preparing the instant coffee flakes of the present invention.

Perhaps the most important and significant advantage achieved by preferred flake-containing instant coffee compositions of the present invention is the provision of an instant coffee composition which can be highly aromatized with an appropriate coffee oil and yet still be free-flowing and possess a high degree of measurability. This result is accomplished by adding an aromatizing oil to instant coffee particles prior to the roll milling of these particles so that oil-containing flakes are formed. It has been discovered that this novel method of incorporating oil into an instant coffee composition tends to "immobilize" the oil, thus preventing the oil from interfering with the flowability and measurability of the composition.

Therefore, as a more specific summary, this invention involves the novel process which comprises roll-milling particles of instant coffee into flakes, and it also involves novel instant coffee flakes having a thickness within the range of from about 0.002 inch to about 0.01 inch and a density within the range of from about 1.0 gm./cc. to about 1.5 gm./cc. Preferably, an aromatizing coffee oil is contained in the flakes.

BRIEF DESCRIPTION OF THE DRAWING

The drawing presents a schematic illustration of a process for preparing the flake-containing instant coffee compositions of this invention. The essential step in this process is the roll milling 15 wherein conventional instant coffee particles 3 are compressed and converted into flakes 16. In a preferred embodiment of the process, instant coffee particles 3 and/or 6 and an aromatizing coffee oil 11 are combined in a blending step 7 to form an oil-containing blend 13 which is then milled 15 into flakes 16. The drawing will be discussed in detail hereinafter.

DESCRIPTION OF THE PREFERRED EMBODIMENTS

The roll-milling process described hereinafter can provide flakes of almost any specified thickness and/or density within a wide range, e.g., a thickness of from about 0.001 inch to about 0.015 inch and a density of from about 0.8 to about 1.7 grams per cubic centimeter. However, it has been found most desirable in the instant coffee compositions of this invention to utilize flakes having a thickness within the range of from about 0.002 inch to about 0.01 inch, preferably from about 0.003 inch to about 0.007 inch, and a density within the range of from about 1.0 gm./cc. to about 1.5 gm./cc., preferably from about 1.1 gm./cc. to about 1.3 gm./cc. It has been found that flakes meeting these limits have a sufficient degree of structural integrity to withstand processing steps, e.g., size reduction, mixing and packaging, and to be used in a commercial product which is shipped and/or otherwise extensively handled. Also, flakes of the specified thickness and density have desirable water-solubility properties, e.g., they are truly "instant" and delectable coffee can be readily prepared therefrom by simply adding boiling water.

One feature of the present invention is the unique appearance of flake-containing instant coffee. Such a composition often resembles roast and ground coffee in color variation and light reflectance properties. Additionally, the flakes are flat and generally non-uniform in shape and thus each flake reflects light differently from a different plane much in the same manner as do particles of roast and ground coffee which are also non-uniform and have flat surfaces. Moreover, a composition comprising a combination of flakes and conventional instant coffee has an even closer resemblance to roast and ground coffee because of the variety of particle shapes and sizes present in such a combination.

For the purpose of a unique appearance effect, the instant coffee compositions of the present invention can contain any proportion of flakes desired. For example, a unique-appearing composition can consist of all flakes, or can consist of conventional instant coffee particles combined with only a very small amount of flakes, e.g., 5% (unless noted otherwise, all percentages specified herein are by weight). When the appearance of roast and ground coffee is the primary objective, the instant coffee composition of the present invention preferably contains from about 20% to about 95% flakes and from about 5% to about 80% of conventional instant coffee particles, e.g., freeze-dried particles, spray-dried particles, or mixtures thereof. A highly preferred composition contains from about 30% to about 70% flakes and from

---

[1] In this specification and in the appended claims, the term "density," used alone, refers to the absolute density of individual particles. The term "bulk density" refers to the over all density of a plurality of particles measured after vibratory settlement in a manner such as that described on pages 130, 131 of "Coffee Processing Technology," Avi Publishing Co., Westport, Conn., 1963, vol II. A specific method of determining bulk density, as the term is used herein, is described immediately prior to Examples IV–XV, infra.

about 30% to about 70% conventional instant coffee particles.

Particularly desirable-appearing compositions which very closely resemble roast and ground coffee can be prepared when the portion of the composition comprising conventional instant coffee particles is comprised of different-colored particles. Examples of a suitable instant coffee which contain different-colored particles are described in the co-pending U.S. patent application of Eddy R. Hair, Ser. No. 598,004, filed Nov. 30, 1966 now U.S. Pat. No. 3,493,388, issued Feb. 3, 1970. The flake portion of the instant coffee composition can also be comprised of different-sized flakes and/or different-colored flakes to further enhance the overall product appearance. Methods of making such flakes will be described hereinafter.

In all of the instant coffee compositions of this invention, the flakes preferably have a size ranging from about 0.02 inch to about 0.5 inch, most preferably from about 0.03 inch to about 0.2 inch in cross-sectional diameter. These limits are primarily for the purpose of providing a product which has a proper appearance. In addition, and particularly when a composition contains a large proportion of flakes, flake sizes of less than about 0.02 inch can result in a composition having an undesirably high bulk density, and flake sizes larger than about 0.5 inch can result in a composition that is difficult for the consumer to handle and measure, for example, on a teaspoon.

As mentioned previously, control of foam in an instant coffee composition can be accomplished by milling a portion of the instant coffee particles into flakes in accordance with this invention. The milling process is believed to essentially squeeze entrapped air or other gas out of the particles, thereby eliminating a primary source of foam. It has been discovered that the addition of as low as about 20% flakes to conventional instant coffee particles provides a composition which has a recognizable and desirable reduced foaming effect. An instant coffee composition which contains more than about 80% flakes exhibits essentially no foam. The percentage of flakes can be varied, of course, according to the amount of foam reduction required. For example, changes in bean formulation, roasting, extraction, and drying conditions can all affect the amount of foam in the final product. An increase in the proportion of flakes can be used to prevent any adverse effects caused by processing changes. It is noteworthy that the foam elimination or reduction achieved by the discovery of the present invention offers a highly desirable method of solving instant coffee foam problems, because it does not involve the use of non-coffee foam depressers or similar additives in the coffee product.

Conventional spray-dried or freeze-dried instant coffee particles generally have a bulk density within the range of from about 0.10 gm./cc. to about 0.40 gm./cc. Instant coffee products for consumer use desirably have a bulk density within the range of from about 0.20 gm./cc. to about 0.70 gm./cc. Thus, it is often necessary to modify the bulk density of spray-dried or freeze-dried instant coffee compositions before packaging into a commercial product. A common method of controlling density is to spray- or freeze-dry to a lower bulk density than is desired in the final product, and then to undertake a sensitive controlled densification step prior to packaging. The densification step, as mentioned previously, involves breaking down large particles to eliminate void spaces, but this in turn has the undersirable effect of making the composition more dusty due to the creation of fines, e.g., very small dusty particles. Also as mentioned previously, it is not economical to simply discard these fines. By means of the present invention, however, the undesirable fines can be removed from the instant coffee composition and these particles can then be made into flakes and incorporated back into the instant coffee composition in flake form. As mentioned hereinbefore, the flakes of this invention have a density within the range of from about 1.0 gm./cc. to about 1.5 gm./cc. and more preferably have a density within the range of from about 1.1 gm./cc. to about 1.3 gm./cc. These flakes have a bulk density within the range of from about 0.45 gm./cc. to about 0.65 gm./cc. Thus, it is readily apparent to those skilled in the art that varying the amount of said flakes in an instant coffee composition is a unique and advantageous method of establishing any desired bulk density therein. Moreover, by eliminating the fine, dusty particles a superior product is provided. From the standpoint of bulk density, a preferred instant coffee composition within the scope of the present invention has a bulk density within the range of from about 0.20 gm./cc. to about 0.65 gm./cc., most preferably, from about 0.25 gm./cc. to about 0.40 gm./cc., and is comprised of a combination of conventional spray-dried or freeze-dried instant coffee particles and flakes.

Although the instant coffee products presently available are satisfactory in most respects, they are, unless an aromatizing oil has been added, characterized by the absence of the coffee-like aroma which is typically found in freshly brewed coffee. Attempts have been made to aromatize coffee wherein a uniform mixture of coffee with an aromatizing principle, e.g., coffee oil, has been prepared but such products generally have other undesirable physical properties.

More specifically, these prior attempts have not heretofore produced a free-flowing oil-aromatized instant coffee product. Aromatization at the desired level has resulted in an apparent wetness or dampness which renders the coffee tacky and difficult to handle during packaging. Aside from the very real aesthetic deficiencies with resulting reduced consumer acceptance of a non-free flowing coffee powder, it is difficult for the consumer to spoon or pour measured amounts from the container. This undesirable feature of the oil-enriched coffee particles tends to increase on storage, especially at elevated temperatures. Another undesirable aspect has been the substantial impossibility of preparing an aromatized free-flowing coffee which retained its desirable characteristics, particularly its flowability, during the handling necessary during processing operations and particularly during packaging.

In accordance with the certain preferred embodiments of the present invention, it has now been discovered that an oil-aromatized, free-flowing, easily measurable and spoonable instant coffee composition can be prepared by a process which comprises roll-milling a mixture of instant coffee particles and coffee oil to form oil-containing flakes. These oil-containing flakes can then be used per se as an instant coffee composition or can be added in various proportions to conventional instant coffee particles to form any desired instant coffee composition.

Quite unexpectedly, the incorporation of an aromatizing oil into flakes of instant coffee as disclosed herein tends to "immobilize" the oil. That is, the oil-containing flakes of this invention are not sticky or tacky as are conventional oil-aromatized instant coffee particles. Moreover, this highly desirable "immobilizing" result is achieved in the present invention without significantly detracting from the aromatizing properties of the oil.

As little as 0.1% and as much as 20% oil can be incorporated into the instant coffee flakes of the present invention to provide aromatized flakes.

Thus, a preferred embodiment of the present invention provides an aromatized, free-flowing instant coffee composition containing instant coffee flakes having a thickness within the range of from about 0.002 inch to about 0.01 inch and a density within the range of from about 1.00 gm./cc. to about 1.5 gm./cc., said flakes having incorporated therein from about 0.1% to about 20% of an aromatizing coffee oil. A preferred amount of oil in the flakes for an aromatized, free-flowing composition is within the range of from about 0.2% to about 15% with about 0.2% to about 1% being especially preferred.

The oil-containing flakes can be used per se as an instant coffee composition as mentioned hereinbefore or, preferably, they are combined with up to about 95% by weight of conventional instant coffee particles. A preferred aromatized, free-flowing instant coffee composition within this embodiment of the invention contains from about 10% to about 90% of the oil-containing flakes, the balance being conventional instant coffee particles. A highly preferred composition within this embodiment contains from about 30% to about 70% of the oil-containing flakes, the balance being conventional spray- or freeze-dried instant coffee particles. The conventional portion of the instant coffee composition can also be aromatized if desired by adding thereto from about 0.1% to about 1% of an aromatizing oil prior to admixture with the flakes.

As noted in the drawing, conventional instant coffee, such as spray-dried particles 1 or freeze-dried particles 2 serve as preferred starting materials 3 in preparing the unique flake-containing instant coffee product of the present invention. Other instant coffee powders can also be used as the starting material, for example, drum-dried, foam-mat dried, and vacuum-dried instant coffees or combinations thereof.

Coffee particles used as the instant coffee starting material 3 of this invention can be prepared by any convenient process. Conventionally, instant coffee is prepared by roasting and grinding a blend of coffee beans, extracting the roast and ground coffee with water to form an aqueous coffee extract, and drying the extract to form the instant coffee product. Various techniques, the most important of which are discussed below, allow the removal and preservation of the more fugitive coffee flavor materials, and their subsequent readdition to the coffee product in a manner wherein they are not destroyed.

Typical roasting equipment and methods for roasting coffee beans are described, for example, in Sivetz & Foote, "Coffee Processing Technology," Avi Publishing Co., Westport, Conn., 1963, vol. 1, pp. 203–26. Coffee oil is often expelled from a portion of the roasted beans prior to grinding as disclosed hereinafter. The coffee beans which have not been oil-expelled are ground ,preferably to a United States Standard screen size of from about 8 mesh to about 20 mesh. Typical grinding equipment is described, for example, in Sivetz & Foote, supra, pp. 239–50.

While numerous types of continuous or batch extraction systems can be used, the most commonly used system for the extraction of roast and ground coffee is a multi-column extraction train. This system is composed of a number of elongated extraction columns connected in series for continuous counter-current operation. While in these columns, and prior to extraction, the roast and ground coffee can be distilled to remove a volatile flavor fraction, and the flavor fraction can be condensed. The distillation often is accomplished by passing steam through the coffee column for from about 10 to about 45 minutes. The condensate can be added immediately to a previously obtained extract; if not, it should be chilled to about 20° F. or less and maintained at that temperature until such time as it is added to an extract.

Once the distillation operation is completed, the coffee is extracted by admitting hot water, such as from about 320° F. to about 375° F., to the last column of the extraction train. The temperature decreases as the water passes through the system, and is withdrawn from the column containing the freshest (previously unextracted) roast and ground coffee at a temperature of from about 190° F. to about 230° F. Typical disclosures of equipment and methods which can be used in the above operations are as follows: steam distillation—Sivetz, supra, pages 43–46, and U.S. Pat. 2,562,206 to Nutting, issued July 31, 1951; extraction—Sivetz and Foote, supra, pp. 261–378, and U.S. Pat. 2,515,730 to Ornfelt, issued July 18, 1950.

Once the coffee extract has been obtained, it is preferable for the extract to be concentrated to at least about 45% by weight coffee solubles. This concentration step is particularly beneficial for extracts which contain a previously obtained distillate. The high concentration of coffee solubles helps to preserve the fugitive coffee flavor materials from deterioration. Concentration can be by any conventional method, such as freeze concentration, thin film evaporation and flashing, or by the addition of previously dried coffee powder. The extract is then dried. While any convenient drying method can be used, the most common drying method is spray-drying. Spray-drying procedures, particularly as related to instant coffee products, are well known in the art and need not be described in detail herein. Typical disclosures on spray-drying processes and equipment are found in Sivetz and Foote, supra, vol. I, chapters 11 and 12.

Alternatively, the coffee extract can be freeze-dried. Freeze-dried instant coffee is prepared by freezing a coffee extract prepared as described above. The frozen extract, granulated if desired, then is placed in a chamber under vacuum (preferably less than 500 microns of mercury absolute pressure) and maintained at low temperatures (preferably less than −15° F.). Heat then is applied to remove water from the frozen extract by sublimation. Processes of this type are often capable of achieving excellent flavor retention during drying.

The type of freeze-drying equipment which is used in preparing the freeze-dried coffee described above is well known to those skilled in the art. Many manufacturers produce commercial and laboratory-size freeze dryers which are useful in preparing freeze-dried coffee. Freeze-dried coffee for use herein can be prepared by any known freeze-drying process. Typical disclosures relating to processes and equipment for freeze-drying can be found, for example, in Copley and Van Arsdel, "Food Dehydration," Avi Publishing Co., Westport, Conn., 1964, vol. II, pp. 105–31, Perry, "Chemical Engineers' Handbook," Mc-Graw-Hill Book Co., New York, 4th ed., 1963, pp. 17–26 to 17–28, Tressler and Evers, "The Freezing Preservation of Foods," Avi Publishing Co., Westport, Conn., vol. 1, pp. 612–26, and in U.S. Pat. 2,751,687 to Colton, issued June 26, 1956.

Irrespective of source, and referring again to the drawing, the instant coffee starting material 3 can be subjected to a densification step 4. This involves breaking down the larger particles and thus reduces void spaces. Suitable apparatus for accomplishing the densification are ribbon blenders, paddle mixers, or impact mills. The densified product is then preferably size classified 5, for example, by passing through a set of vibrating screens or by air elutriation, wherein the smaller or fine particles 6 are separated for blending 7 and the larger-sized particles 8 are separated for final mixing 9 with flakes 20, optionally passing through a conventional aromatization step 10 with oil 12 to form aromatized particles 8–A. If desired, the densification step 4 and/or the size classification step 5 can be bypassed 3, 23 or 3–C.

The aromatizing coffee oils 11, 12 which are preferably employed in the practice of this invention can include those prepared from a variety of sources, both natural or artificial, or mixtures thereof. In either case, the oils will contain at least a substantial proportion of those components which are responsible for the aroma and odor of the coffee.

Among the aromas which can be employed in the practice of this invention are those natural aromas which are found at various points in the processing of coffee; those obtained by solvent extraction or expelling of coffee beans may be employed. It is also possible to utilize artificial aromas. One preferred aromatizing material may be raw expelled coffee oil containing an aroma concentrate. Under preferred conditions, the aromatizing oil will be prepared, e.g., by expelling, in an inert atmosphere of carbon dioxide or nitrogen and will be maintained and stored under mild to low temperature conditions. More specifically, preferred coffee oil is expelled from a portion of roasted coffee beans prior to the grinding thereof. The oil, which contains a significant amount of high quality coffee flavor and aroma constituents, is chilled to about 20° F. or less and stored 22 for addition to instant coffee at the blending step 7 and/or at the conventional aromatization step 10. Typical oil expelling equipment is described, for example, in Sivetz and Foote, "Coffee Processing Technology," Avi Publishing Co., Westport, Conn., 1963, vol. 2, pp. 27–30.

Just prior to the time when the aromatizing oil 11 is to be used 7 in accordance with this invention, or in the conventional manner 10, it will preferably be heated to above the congeal temperature range of the oil. Typically, the congeal range of the oils employed can be 48° F.–55° F. The oil is usually warmed to about 5° F.–15° F. above its congeal range, preferably to at least about 60° F., and within the range of 60°–70° F. The conventional aromatization step 10 is accomplished by any of the well-known methods, e.g., by spraying the oil onto the particles under an inert atmosphere.

In any event, the oil 11 is blended 7 in desired amounts with the coffee particles 6 and/or 3 and/or 23 to form a blend of coffee and oil 13, which is preferably homogeneous. The blending can be accomplished in any suitable type of standard power mixer such as a tumbling or ribbon blender or a paddle mixer. Alternatively, the oil can be sprayed onto the coffee particles. Recycled material 14-A can optionally be incorporated into the blending step 7.

As is readily apparent, the blending step 7 can be bypassed 6-B or 3-B if it is desired to prepare flakes which do not contain oil.

In the key step of this invention, the instant coffee particles 6-B and/or 3-B and/or the blended mixture of coffee and oil 13 are subjected to roll-milling 15. The material is fed into the nip between two rolls of a roll mill which are rotating so that the coffee material is pulled into the nip and compresses into flakes 16 which can then be removed from the roll.

Flakes 16 can be made from instant coffee 3-B and/or 6-B with no added oil but the milling operation 15 is facilitated and the yield of usable flakes 16 is higher if an oil-containing blend 13 is used. The amount of oil may vary according to the purpose for making flakes. For example, if the flakes are being made primarily for use in affecting final product appearance, foam, or density, from about 0.01% to about 0.1% oil can be blended with the coffee to facilitate the milling. However, if flakes are being made to immobilize the oil in an aromatized product, from about 0.1% to about 20% oil can be blended with the coffee prior to milling.

Factors in the milling operation include: (A) roll diameter, (B) roll surface finish, (C) roll speeds and relative speeds, (D) nip pressure, (E) amount of oil in the coffee blend to be milled, (F) temperature of the rolls, (G) moisture content of the coffee to be milled (prior to addition of oil), and (H) bulk density of the coffee to be milled (prior to addition of oil). The moisture content in the material to be milled is preferably from about 0.5% to about 7%, most preferably from about 2% to about 5%. Appreciably higher moisture levels than 5%, for example, levels greater than about 7%, tend to cause undesired fusion in the flakes. The bulk density of the coffee particles to be milled is preferably from about 0.1 gm./cc. to about 1.0 gm./cc., most preferably from about 0.2 gm./cc. to about 0.4 gm./cc.

Flakes can be made with one pass through a two-roll mill having roll diameters within a wide range, e.g., as small as about 2 inches or smaller and as large as about 80 inches or larger, preferably from about 3 inches to about 30 inches, and operating at peripheral speeds from about 1 foot per minute up to about 500 feet per minute, preferably from about 10 feet per minute to about 400 feet per minute. The optimum yield of desirable flakes is generally obtained when both rolls operate at the same speed. When the oil level in the blend is above about 1%, the oil effectively acts as a lubricant, thus reducing the shearing action in the flakes caused by a difference in roll speed between the two rolls, and in this event, different roll speed can be utilized. Speed ratios in excess of 1.5:1 are not desirable irrespective of the amount of oil. Preferably, the roll speed ratio is within the range of from about 1:1 to about 1.4:1.

Highly polished roll surfaces are beneficial, especially for roll diameters above about 6 inches and when using coffee blends containing less than about 0.7% oil. The polished surfaces reduce the friction between the coffee blend and the rolls, thus preventing the rolls from dragging excess material into the nip which can result in flakes that are undesirably thick and/or dense or which can cause operational difficulties with the roll mill.

Nip pressures can vary from about 25 pounds per inch to about 3000 pounds per inch, preferably from about 100 pounds per inch to about 2500 pounds per inch. The lower pressures are satisfactory for most applications and the upper part of the range generally is required if no or little oil is included in the coffee or if the coffee is very dense. The flakes can generally be prepared with a thickness within a range of from about 0.001 inch up to 0.015 inch and a density within the range of from about 0.8 gm./cc. to about 1.7 gm./cc. The thickness and density of the flakes depends primarily on the nip pressure and to a lesser extent on the percentage of oil in, and the bulk density and moisture of, the coffee being milled.

The temperature of the mill rolls can be varied over a wide range, e.g., from about 60° F. to about 200° F. The temperature of the mill rolls, however, does affect the color of the flakes. If lighter color flakes are desired the mill roll temperature is preferably maintained within the range of from about 60° F. to about 140° F. If darker color flakes are desired, the mill roll temperature is preferably maintained with the range of from about 130° F. to about 200° F. The mill roll temperature is preferably not maintained above about 200° F. as higher temperatures can damage coffee flavor and/or cause excessive softening of the material during milling. Flakes containing high proportions of oil tend to be darkly colored, irrespective of roll temperature.

Especially preferred conditions for the milling step, when it is desired to prepare flakes having a thickness within the range of from about 0.002 inch to about 0.01 inch and a density within the range of from about 1.0 gm./cc. to about 1.5 gm./cc., are a follows when the coffee or coffee-oil blend to be milled has the specified oil content:

(A) For coffee containing less than 0.1% oil:

roll surface—very highly polished
roll diameter—4 inches to 22 inches
roll speeds—10 f.p.m. to 80 f.p.m., 1:1 ratio
nip pressure—1000 p.i. to 3000 p.i.
roll temperature—80° F. to 200° F.

(B) For blends containing 0.1% to 1.0% oil;

roll surface—highly polished
roll diameter—4 inches to 22 inches
roll speeds—20 f.p.m. to 400 f.p.m.
nip pressure—100 p.i. to 3000 p.i.
roll temperature—70° F. to 150° F.

(C) For blends containing greater than 1% oil;

roll surface—moderately polished
roll diameter—4 inches to 22 inches
roll speeds—20 f.p.m. to 200 f.p.m.
nip pressure—100 p.i. to 1600 p.i.
roll temperature—65° F. to 100° F.

The milled flakes 16 are preferably size reduced 17. Suitable apparatus for this operation can comprise a set of vibrating screens with a plurality of small, hard balls or beads thereon. Other standard grinding slicing or breaking devices such as a hammermill, Fitz mill slitter, or Entoleter can also be used for this step. The flakes are then preferably size-classified 18 and those deemed too small 14 can be recycled 14–A into the blending step 7 or directly 14–B into the milling step 15. Those flakes deemed excessively large for the desired purpose can be recycled 19 for further size reduction 17. The size-classification step 18 can be accomplished with vibrating screens such as woven wire screens or parallel wire screens.

As a final step in the process, the properly-sized instant coffee flakes 20 can be used per se 20–A or can be mixed 9 with instant coffee particles 3, 3–A, 8, 8–A, or mixtures thereof, to form the desired flake-containing instant coffee composition 21. The final mixing step 9 is a simple procedure and can be accomplished in any conventional manner which provides reasonable admixing without undue attrition of the instant coffe particles and/or flakes. For example, a ribbon blender, powder riffler, or a fluidized bed can be used for this step.

EXAMPLE I

The following represents a specific example of one embodiment of the present invention wherein a process illustrated by the drawing is utilized to prepare a flake-containing instant coffee composition.

Conventional spherical-shaped instant coffee particles as obtained from a spray-drying process 1 having a bulk density of about 0.22 gm./cc., a moisture content of about 4%, and a size distribution ranging from about 0.007 inch to about 0.03 inch in diameter were used as the starting material 3. These particles were subjected to densification 4 by passing through a ribbon blender to a bulk density of 0.31 gm./cc. The particles thus formed were not size classified 5 but were used in bulk 23 for blending with oil. The blending step 7 was accomplished by placing the coffee 6 in a two gallon paddle mixer operating at 20 r.p.m. and then adding an aromatizing coffee oil 11, which had been expressed from roasted coffee beans, stored at less than 20° F., and then heated to a temperature of 70° F., in an amount so that the oil comprised 0.3% of the coffee-oil mixture. Mixing was continued for about one minute at which time a homogenous blend 13 was formed.

The milling step was accomplished by passing the coffee-oil blend 13 one time through a Lehman roll mill having two highly polished 4-inch diameter, 8-inch wide rolls, operating at the following conditions:

Front roll peripheral speed—40 f.p.m.
Back roll peripheral speed—40 f.p.m.
Temperature of rolls—75° F.
Nip pressure—150 p.i.

Light colored, oil-containing (0.3%) flakes 16 having a thickness of about 0.004 inch and having a density of about 1.3 gm./cc. were removed from the mill. The flakes were size-reduced 17 on a stack of vibrating screens ranging in size from 4 mesh to 10 mesh, having one-fourth inch diameter glass beads thereon. The flakes were then size classified 18 by sifting through 10 mesh and 30 mesh screens; those flakes having a size of greater than 10 mesh were recycled 19 for further size reduction and those having a size of less than 30 mesh were recycled 14–B for further milling. The remaining flakes 20 had a size ranging from about 0.02 inch to about 0.08 inch and had a bulk density of about 0.5 gm./cc. These flakes still had a thickness of about 0.004 inch, a density of about 1.3 gm./cc., and contained the aromatizing coffee oil in an amount of about 0.3%. An additional amount of the spray-dried instant coffee particles 3 were aromatized 10 by spraying on 0.7% of the same oil 12 used to prepared the coffee-oil blend. The particles 3–A thus formed and the flakes 20 were then admixed by passing them together through a riffle-chute (fluidized bed) to form an instant coffee composition containing about 60% of the oil-containing flakes and about 40% of the conventional instant coffee particles. Thus, the oil comprised of about 0.5% of the total composition. The overall composition had a desirable particle size distribution ranging from about 0.007 inch to about 0.08 inch and had a desirable bulk density of about 0.32 gm./cc. This excellent instant coffee composition had desirable flavor and solubility properties, was highly aromatized but was free-flowing and easy to measure. It exhibited very low foaming, was relatively free from dustiness, and more nearly resembled roast and ground coffee in appearance than conventional instant coffee compositions.

In this example, a size-classification step 5 can be introduced after the densification step 4 wherein the particles 23 are classified into portions according to size. For example, the particles 23 are size-classified 5 by sifting through a woven wire screen of 50 mesh (0.01 inch) and divided into two portions: 40% into a first portion comprising the larger-sized particles 8 having a size distribution of from about 0.01 inch to about 0.03 inch, and 60% into a second portion comprising the smaller-size particles 6 having a size distribution of from about 0.007 inch to about 0.01 inch. Flakes 20 are prepared as described above from the small particles 6 and then combined with the large particles 8 to form a non-dusty instant coffee composition 21 having a particle size ranging from about 0.01 inch to about 0.08 inch.

EXAMPLE II

This represents another example of how the oil-containing flakes of the present invention can be utilized to prepare a highly desirable free-flowing, aromatized instant coffee composition.

Conventional spray-dried instant coffee was blended with coffee oil (92% coffee, 8% oil) in a paddle mixer. The blend was milled by making one pass through a two-roll mill (Farrel-Birmingham 6-inch x 13-inch laboratory mill) having 6-inch diameter, 13-inch wide rolls, on which the front roll had a peripheral speed of 23.5 feet per minute and the back roll had a peripheral speed of 19.5 feet per minute. The roll temperature was about 70° F. and the nip pressure was about 162 pounds per inch. The oil-containing flakes produced were darkly colored and had a thickness of about 0.006 inch and a density of about 1.2 gm./cc. Size reduction was accomplished by forcing the flakes through a 16 mesh screen. The resulting flakes had an average size of about 0.04 inch and a bulk density of about 0.56 gm./cc. The flakes (12.5%) were mixed with a spray-dried coffee (48.5%), and a freeze-dried coffee (39%) to form an instant coffee composition whose overall composition then was 60% spray-dried coffee (12.5% flakes, 48.5% conventional particles), 39% freeze-dried coffee and 1% coffee oil. This instant coffee composition, which had a bulk density of about 0.35 gm./cc., was evaluated and found to have highly desirable flavor and solubility characteristics.

The flowability or measurability of this composition was determined by a test generally referred to as the "angle of repose" test. In this test, the measurability grade is obtained by computing the base angle of repose of a cone of instant coffee formed by pouring 30 grams of the coffee through a funnel onto a flat circular surface. The measurability grade thus ranges from 0° to 90° wherein grades higher than 50° indicate a sticky non-free-flowing, difficult to measure composition, and grades of 40° or less indicate a "dry," free-flowing, very easy to measure composition.

In the above-described test, the instant coffee composition of this example had a measurability grade of 40°.

A non-flake containing instant coffee composition having essentially the same composition as the product of Example II (60% conventional and spray-dried instant coffee particles and 39% conventional freeze-dried instant coffee particles) was prepared and aromatized with 1% oil by a conventional spray-on technique. This composition had a measurability grade of 55°.

EXAMPLE III

This example illustrates how a flake-containing instant coffee composition can be prepared having a desirable and unique appearance.

A coffee extract was spray-dried in two different ways to produce both a light-colored ($L=27.7$, $a=9.1$, $b=13.8$, Hunter scale) and a dark-colored portion ($L=20.7$, $a=7.1$, $b=8.7$, Hunter scale), both of which had about the same flavor. These portions were then mixed together (80% dark, 20% light) and part of this dark-light coffee mixture was blended with 0.5% oil to make a blend for milling. This blend was milled on the same mill and under the same conditions mentioned above in Example II but with both rolls going at the same speed (10 feet per minute). The flakes produced were light-colored, had a thickness of about 0.005 inch, and a density of about 1.2 gm./cc. These flakes were reduced to a desired size ranging from about 0.03 inch to about 0.1 inch by successively forcing through 4, 8, and 12 mesh screens. The flakes were combined with the dark-light coffee mixture (to which 0.3% coffee oil had been added by conventional spray-on techniques) in the proportions of 40% flakes and 60% of the aromatized dark-light coffee mixture. Thus, the final composition consisted of 39.8% of the light-colored flakes, 59.8% of the 80/20 dark-light coffee mixture, and 0.4% coffee oil. This composition had a bulk density of about 0.35 gm. and had a unique appearance which more closely resembled roast and ground coffee than conventional instant coffee.

The following examples illustrate how the instant coffee flake discovery of the present invention can be utilized to prepare any number of instant coffee compositions having desired physical characteristics. In each Example IV–XV, the flakes were prepared from conventional spray-dried instant coffee particles and contained 0.5% coffee oil. They had a thickness of about 0.007 inch, a density of about 1.2 gm./cc., a bulk density of about 0.52 gm./cc., and a size ranging from about 0.02 inch to about 0.07 inch. In Examples IV–IX, the balance of the instant coffee composition (the portion in addition to the flakes) was comprised of conventional spherical particles of spray-dried instant coffee having a bulk density of about 0.33 gm./cc., a particle size of about 0.01–0.03 inch, and to which 0.5% coffee oil had been added prior to admixture with the flakes.

In Examples X–XV, the balance of the instant coffee composition (the portion in addition to the flakes) was comprised of conventional spherical particles of spray-dried instant coffee having a bulk density of about 0.23 gm./cc., and a particle size of about 0.02–0.03 inch. (The fines, i.e., spray-dried particles having a size of less than 0.02 inch, had been removed.)

In the following examples, the bulk density was measured by pouring 57 grams of instant coffee into a graduated cylinder. The graduated cylinder was gently vibrated for 5–10 seconds until the coffee sample ceased to settle, and the volume of the sample was then read. The bulk density was then calculated from the known weight and volume of the sample.

The measurability grade was computed by the method described above in Example II.

The dust was measured as a percentage of particles passing through an 80 mesh screen.

The foam was measured by pouring hot water (200° F.) into a cup containing 2.0 grams of instant coffee. Sixty seconds after addition of the water, the foam in the cup was visually observed and compared to a set of ten standard photographs showing varying degrees of foam graded on a scale of 1–10 wherein a grade of 10.0 indicates essentially no foam and a grade of 1.0 indicates a very excessive level of foam. The foam in the sample cup was then assigned the grade of the photograph to which it most nearly corresponded.

EXAMPLES IV–IX

[Flakes and conventional spray-dried particles; flakes containing 0.5% coffee oil, 0.5% coffee oil added to conventional particles]

| | Weight percent | | | | | |
|---|---|---|---|---|---|---|
| | Flakes in product | Spray-dried particles in product | Bulk density, gms./cc. | Measurability, grade | Foam | Dust |
| Example: | | | | | | |
| IV (control) | 0 | 100 | 0.33 | 43.8 | 7.5 | 12.4 |
| V | 20 | 80 | 0.36 | 43.3 | 7.8 | 9.9 |
| VI | 40 | 60 | 0.42 | 41.9 | 8.0 | 7.4 |
| VII | 60 | 40 | 0.48 | 32.8 | 8.0 | 5.0 |
| VIII | 80 | 20 | 0.56 | 32.0 | 9.3 | 2.5 |
| IX | 100 | 0 | 0.61 | 34.6 | 9.5 | 0.0 |

EXAMPLES X–XV

[Flakes containing 0.5% coffee oil; no coffee oil added to conventional particles]

| | Weight percent | | | | | |
|---|---|---|---|---|---|---|
| | Flakes in product | Spray-dried particles in product | Bulk density, gms./cc. | Measurability, grade | Foam | Dust |
| Example: | | | | | | |
| X (control) | 0 | 100 | 0.23 | 39.5 | 2.7 | 0.0 |
| XI | 20 | 80 | 0.27 | 37.0 | 4.5 | 0.0 |
| XII | 40 | 60 | 0.31 | 37.1 | 5.5 | 0.0 |
| XIII | 60 | 40 | 0.37 | 35.5 | 7.8 | 0.0 |
| XIV | 80 | 20 | 0.47 | 35.2 | 8.5 | 0.0 |
| XV | 100 | 0 | 0.61 | 34.6 | 9.5 | 0.0 |

It is thus apparent that the unique instant coffee flakes of the present invention can be advantageously utilized in a wide variety of novel instant coffee compositions.

EXAMPLE XVI

This example is a further illustration of the production of instant coffee flakes. Conventional instant coffee particles obtained from a spray drying process having a bulk density of 0.3 gm./cc. and a moisture content of 3.5% were used as the starting material. These instant coffee particles were blended with 0.2% of an aromatizing coffee oil by mixing in a paddle mixer operating at 20 r.p.m. until a homogeneous blend was formed. The coffee-oil blend was passed on time through a roll mill having two highly polished 16-inch diameter, 24-inch wide rolls operating at peripheral speeds of 200 f.p.m., a roll temperature of 170° F., and a nip pressure of 1250 pounds per inch. Light colored, oil-containing (0.2%) flakes having a thickness ranging from about 0.003 inch to about 0.007 inch and a density of about 1.3 gm./cc. were removed from the mill. These flakes comprised an aromatized and free-flowing instant coffee composition.

What is claimed is:

1. Free-flowing compressed instant coffee flakes, which produce a beverage with substantially no cup foam, said flakes having a thickness within the range of from about 0.002 inch to about 0.01 inch, a density within the range of from about 1.0 gm./cc. to about 1.5 gm./cc., and a measurability grade of less than 40°.

2. The instant coffee flakes of claim 1 which have a thickness within the range of about 0.003 inch to about 0.007 inch.

3. The instant coffee flakes of claim 1 which have a density within the range of about 1.1 gm./cc. to about 1.3 gm./cc.

4. The instant coffee flakes of claim 1 which have a size ranging from about 0.02 inch to about 0.5 inch in cross-sectional diameter.

5. The instant coffee flakes of claim 1 which have incorporated therein from about 0.1% to about 20% of an aromatizing coffee oil.

6. The instant coffee flakes of claim 5 wherein the amount of oil is within the range of from about 0.2% to about 15%.

7. An instant coffee composition which contains from about 10% to about 90% of the oil-containing flakes of claim 5, the balance being conventional instant coffee particles, said composition having a foam grade of at least 4.5.

8. An instant coffee composition which contains from about 20% to about 95% of the flakes of claim 1 and from about 5% to about 80% of conventional instant coffee particles, said composition having a foam grade of at least 4.5.

9. A unique-appearing, low foaming, aromatized, free-flowing instant coffee composition having a foam grade of at least 4.5, which comprises:
   (a) from about 30% to about 70% free-flowing compressed flakes of instant coffee having a measurability grade of less than 40° a thickness within the range of from about 0.003 inch to about 0.007 inch, a density within the range of from about 1.1 gm./cc. to about 1.3 gm./cc., a size within the range of from about 0.03 inch to about 0.2 inch in cross-sectional diameter, and having incorporated therein from about 0.2% to about 15% of an aromatizing coffee oil; and
   (b) from about 30% to about 70% conventional instant coffee particles selected from the group consisting of spray-dried and freeze-dried instant coffee, said instant coffee composition having a bulk density within the range of from about 0.20 gm./cc. to about 0.65 gm./cc.

10. The instant coffee composition of claim 9 wherein the amount of oil in the flakes is within the range of from about 0.2% to about 1.0%.

11. The instant coffee composition of claim 9 which has a bulk density within the range of from about 0.25 gm./cc. to about 0.40 gm./cc.

12. The instant coffee composition of claim 9 wherein the flakes are comprised of coffee selected from the group consisting of spray-dried and freeze-dried instant coffee.

13. The process for preparing a unique-appearing, low foaming, aromatized, free-flowing instant coffee composition, which comprises:
   (a) blending instant coffee particles with from about 0.2% to about 15% of an aromatizing coffee oil to form a homogeneous coffee-oil blend;
   (b) roll-milling the coffee-oil blend of step (a) into oil-containing flakes of instant coffee having a thickness within the range of from about 0.002 inch to about 0.010 inch and a density within the range of from about 1.0 gm./cc. to about 1.5 gm./cc.; and
   (c) mixing the oil-containing flakes of step (b) with from about 10% to about 90% of conventional instant coffee particles.

14. The process for preparing a unique-appearing, low foaming, non-dusty, aromatized, free-flowing instant coffee composition, which comprises:
   (a) size-classifying conventional instant coffee particles selected from the group consisting of spray-dried and freeze-dried instant coffee into a portion comprising the smaller-sized particles and a portion comprising the larger-sized particles;
   (b) blending the smaller-sized particles of step (a) with from about 0.2% to about 1.0% of an aromatizing coffee oil to form a coffee-oil blend;
   (c) roll-milling the coffee-oil blend of step (b) to form oil-containing flakes of instant coffee having a thickness within the range of from about 0.002 inch to about 0.010 inch and a density within the range of from about 1.0 gm./cc. to about 1.5 gm./cc.;
   (d) size-reducing the flakes of step (c) to a size ranging from about 0.02 inch to about 0.5 inch in cross-sectional diameter; and
   (e) admixing the flakes of step (d) with the larger-size particles of step (a) to form the instant coffee composition.

15. The process of claim 14 wherein the roll-milling step (c) comprises passing the oil-coffee blend through a two-roll mill having roll diameters within the range of from about 3 inches to about 30 inches, peripheral roll speeds within the range of from about 10 feet per minute to about 400 feet per minute, a roll speed ratio within the range of from about 1:1 to about 1.4:1, and a nip pressure within the range of from about 100 pounds per inch to about 2500 pounds per inch.

16. The process of claim 15 where the instant coffee particles have a moisture level within the range of from about 2.0% to about 5.0% and a bulk density within the range of from about 0.2 gm./cc. to about 0.4 gm./cc.

17. Free-flowing compressed instant coffee flakes characterized by a substantial lack of entrapped air and other gases, said compressed flakes having incorporated therein from about 1% to about 20% by weight of aromatizing coffee oil, a flake thickness of from $2/1000''$ to $10/1000''$, a density of from 1.00 gm./cc. to 1.5 gm./cc. and a measurability grade of less than 40°.

18. The instant coffee flakes of claim 17 which have a thickness within the range from $3/1000''$ to $7/1000''$.

19. The instant coffee flakes of claim 17 which have a density within the range from 1.1 gm./cc. to 1.3 gm./cc.

20. The instant coffee flakes of claim 17 which have incorporated therein from about .2% to about 15% of aromatizing coffee oil.

21. The instant coffee flakes of claim 20 which have incorporated therein from about .2% to about 1% by weight of an aromatizing coffee oil.

22. The process for preparing a unique-appearing, low-foaming, non-dusty, aromatized, free-flowing instant coffee composition which comprises:
   (a) size classifying instant coffee particles having a moisture level within the range of from about 2.0% to about 5.0%, and a bulk density within the range of from about 0.2 gm./cc. to about 0.4 gm./cc., said particles being selected from the group consisting of spray-dried and freeze-dried instant coffee, into a portion comprising smaller sized particles and a portion comprising larger sized particles;
   (b) blending the smaller sized particles of step (a) with from about .2% to about 1% of an aromatizing coffee oil to form a coffee oil blend;

(c) roll milling the coffee oil blend of step (b) through a 2-roll mill having roll diameters within the range of from about 3 inches to about 30 inches, peripheral roll speeds within the range of from about 10 feet/minute to about 400 feet/minute, a roll speed ratio within the range of from about 1:1 to about 1.4:1, and a nip pressure within the range of from about 1000 pounds/inch to about 2000 pounds/inch to form oil-containing flakes of instant coffee having a thickness within the range of from about 0.002 inch to about 0.010 inch, and a density within the range of from about 1.0 gm./cc. to about 1.5 gm./cc.;

(d) size reducing the flakes of step (c) to a size ranging from about 0.02 inch to about 0.5 inch in cross-sectional diameter; and (e) admixing the flakes of step (d) with larger sized particles of step (a) to form the instant coffee composition.

References Cited

UNITED STATES PATENTS

| | | | |
|---|---|---|---|
| 1,271,761 | 7/1918 | Phillips, Jr. et al. | 99—66 |
| 1,903,362 | 4/1933 | McKinnis | 99—65 |
| 2,324,526 | 7/1943 | Morgenthaler | 99—71 |
| 2,400,292 | 5/1946 | Dalton. | |
| 2,897,084 | 7/1959 | Peebles | 99—71 |
| 2,929,717 | 3/1960 | Eskew | 99—71 |
| 3,121,635 | 2/1964 | Eldred | 99—66 |
| 3,293,041 | 12/1966 | Miller | 99—66 |
| 3,468,675 | 9/1969 | Potzl | 99—199 |
| 3,493,388 | 2/1970 | Hair | 99—71 |

DENNIS E. TALBERT, JR., Primary Examiner

U.S. Cl. X.R.

99—71, 80